No. 737,630. PATENTED SEPT. 1, 1903.
A. HUDSON & J. BOWRING.
VEHICLE LIFE GUARD OR OBSTRUCTION REMOVER.
APPLICATION FILED MAR. 17, 1903.
NO MODEL. 2 SHEETS—SHEET 1.
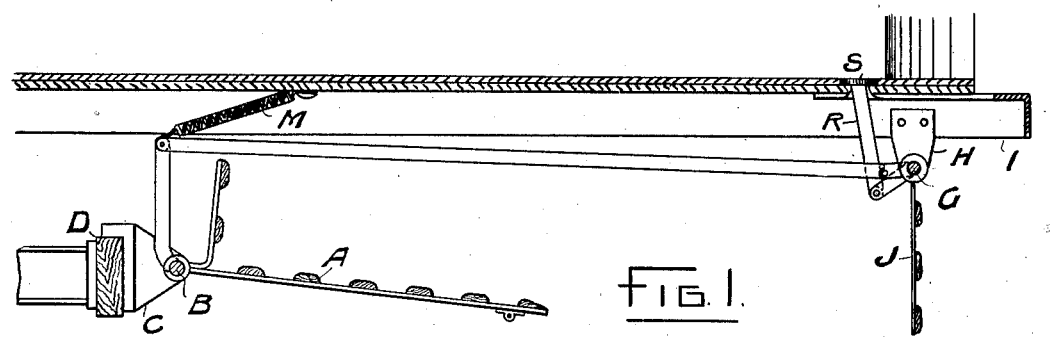
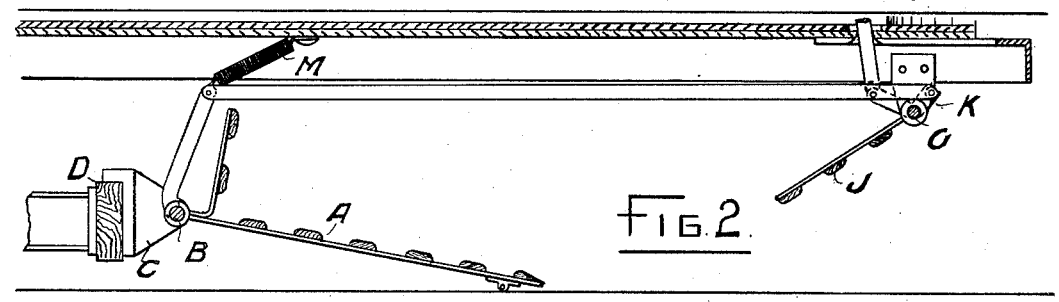
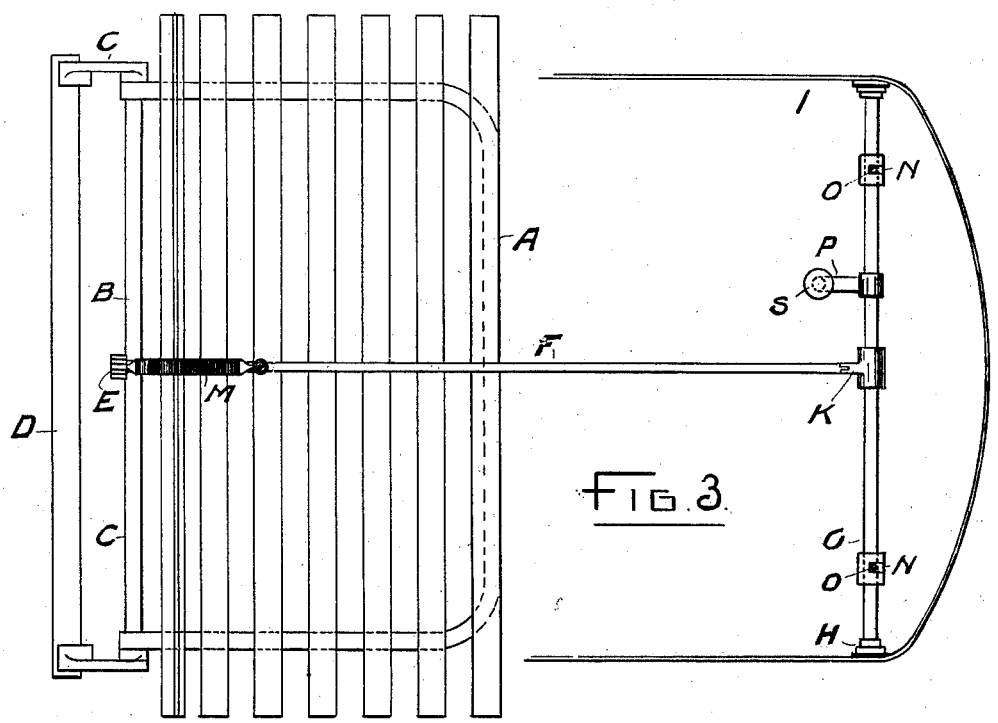

No. 737,630. PATENTED SEPT. 1, 1903.
A. HUDSON & J. BOWRING.
VEHICLE LIFE GUARD OR OBSTRUCTION REMOVER.
APPLICATION FILED MAR. 17, 1903.
NO MODEL. 2 SHEETS—SHEET 2.

No. 737,630. Patented September 1, 1903.

UNITED STATES PATENT OFFICE.

ARTHUR HUDSON AND JOSEPH BOWRING, OF MANCHESTER, ENGLAND.

VEHICLE LIFE-GUARD OR OBSTRUCTION-REMOVER.

SPECIFICATION forming part of Letters Patent No. 737,630, dated September 1, 1903.

Application filed March 17, 1903. Serial No. 148,253. (No model.)

*To all whom it may concern:*

Be it known that we, ARTHUR HUDSON and JOSEPH BOWRING, subjects of the King of Great Britain and Ireland, residing at Manchester, England, have invented certain Improvements in Vehicle Life-Guards or Obstruction-Removers, of which the following is a specification.

This invention refers to and consists of a simple device for normally holding the cradle part of life-guard appliances clear of the ground and automatically causing such cradle to fall when an obstruction strikes the feeler or swing-gate at the front of the car.

Figure 4:
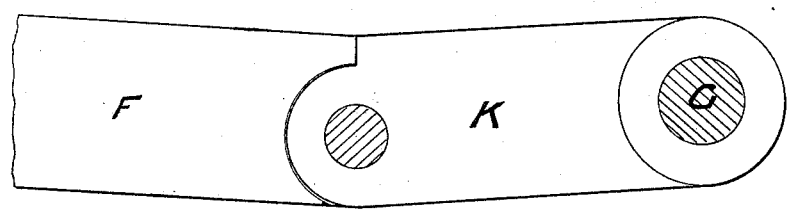
Figure 5:
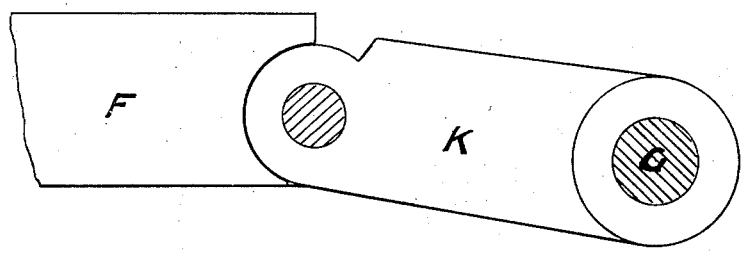

Upon the accompanying drawings, Figure 1 illustrates a longitudinal section of the lower portion of a tram-car fitted with the improved life-guard and showing the parts in their normal position. Fig. 2 illustrates a like view, but showing the parts in the position they occupy when serving to gather up an obstruction. Fig. 3 illustrates a plan. Figs. 4 and 5 illustrate the principal feature of our invention to a larger scale, Fig. 4 showing the position of the parts when the life-guard is out of action and Fig. 5 showing the position of the parts when the life-guard is in action.

According to the invention the life-guard comprises a cradle A, pivoted on axle B in bearings C, carried by the fixed pilot-board D. From the axle B extends a lever-arm E, and to such arm is pivoted one end of a long bar F. At the front of the car and mounted on axle G, carried by brackets H, secured to the car-frame I, is a swing-gate or feeler J. Fast upon the said axle G is a short finger or lever-arm K, and to the end of such lever-arm K and the lever-arm E are connected the respective ends of the link or bar F. The connection of the bar to the lever-arm is in the form of a rule-joint, or such that when the bar lies slightly below the level of the axle G it cannot fall lower, and thereby acts as a toggle (see Figs. 1 and 4) and sustains the cradle in an elevated position. When the feeler or swing-gate J meets an obstruction and moves inward, it breaks the toggle (see Fig. 5) and allows the cradle to fall (see Fig. 2) ready to gather up the obstruction. A spring M is or may be provided to assist the action.

The hinge-bars of the gate are formed with slots N and act upon the axle G through studs O. Hence on the obstruction being passed the gate is free to swing back and assume its vertical position. Upon the axle G is a further lever-arm P, (see Fig. 3,) and to such arm is connected the lower end of a rod R. This rod passes through a countersunk hole in the floor of the car and at its top end terminates in a foot-plate S. When the said toggle is broken, as aforesaid, the rod is lifted up, as shown in Fig. 2.

Upon the parts requiring to be reset the driver of the car presses his foot upon the plate S and forcing it downward causes the axle G to rotate and the lever-arm to push the link F away until it assumes the position shown in Fig. 1, when the toggle is again completed and the cradle A again held elevated.

In lieu of or in addition to the knuckle or rule-joint form of connection between bar F and lever-arm K the downward movement of the lever-arm K may be limited by the foot-plate S and length of the rod R; but we prefer both.

What we claim is—

1. In life-guard appliances for tram-cars and the like and in means for holding the cradle raised and causing it to be automatically lowered on the gate meeting an obstruction, a short lever-arm on the gate-axle, and a link-bar connected with the cradle and the said arm, the connection being in the form of a rule-joint, as set forth.

2. In life-guard appliances for tram-cars and the like and in means for holding the cradle raised and causing it to be automatically lowered on the gate meeting an obstruction and allowing of the parts being reset, a short lever-arm on the gate's axle, a link-bar connected with the cradle and the said arm, a further lever-arm on the said gate-axle, and a rod with foot-plate pivotally connected thereto, and passing through the floor of the car, as set forth.

In witness whereof we have hereunto set our hands in presence of two witnesses.

ARTHUR HUDSON.
JOSEPH BOWRING.

Witnesses:
 WALTER GUNN,
 JOHN CAMP.